(12) United States Patent
Abadi et al.

(10) Patent No.: US 9,280,446 B2
(45) Date of Patent: Mar. 8, 2016

(54) METHOD FOR FINDING ALL VALID INTERPROCEDURAL EXECUTION PATHS ON COBOL IN POLYNOMIAL TIME

(71) Applicant: International Business Machines Corporation, Armonk, NY (US)

(72) Inventors: Aharon Abadi, Eilat (IL); Moria Abadi, Petah Tikva (IL); Ran Ettinger, Tel Aviv (IL); Yishai Feldman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 14/194,821

(22) Filed: Mar. 3, 2014

(65) Prior Publication Data
US 2015/0248342 A1    Sep. 3, 2015

(51) Int. Cl.
  G06F 9/44   (2006.01)
  G06F 11/36  (2006.01)
  G06F 9/45   (2006.01)

(52) U.S. Cl.
  CPC ............ *G06F 11/364* (2013.01); *G06F 8/4435* (2013.01)

(58) Field of Classification Search
  CPC .............................. G06F 11/364; G06F 8/4435
  USPC .................................................. 717/128, 131
  See application file for complete search history.

(56) References Cited

U.S. PATENT DOCUMENTS

| 8,141,064 B2 * | 3/2012 | Chipman .................... 717/154 |
| 8,271,956 B2 | 9/2012 | Howland et al. |
| 2011/0066829 A1 * | 3/2011 | Tye et al. ..................... 712/226 |
| 2013/0031531 A1 | 1/2013 | Keynes et al. |

OTHER PUBLICATIONS

Thomas Reps "On the Sequential Nature of Interprocedural Program-Analysis Problems" Aug. 1996 Acta Informatica vol. 33 Issue 5 pp. 1-16.*
Reps et al., "Precise Interprocedural Dataflow Analysis Via Graph Reachability", POPL '95 Proceedings of the 22nd ACM SIGPLAN-SIGACT symposium on Principles of programming languages, pp. 49-61 , 1995.
Thomas Reps, "On the Sequential Nature of Interprocedural Program-Analysis Problems", Acta Informatica Aug. 1996, vol. 33, Issue 5, pp. 739-757.
Nielson et al., "Interprocedural Control Flow Analysis", Programming Languages and Systems Lecture Notes in Computer Science vol. 1576, 1999, pp. 20-39.
Gutzmann et al., "Towards Path-Sensitive Points-To Analysis", Seventh IEEE International Working Conference on Source Code Analysis and Manipulation, 2007. SCAM 2007, pp. 59-68.

* cited by examiner

*Primary Examiner* — Anna Deng

(57) ABSTRACT

Disclosed are methods for finding all valid paths in a COBOL program. These methods are performed in polynomial time, allowing them to be scaled to accommodate large COBOL programs. As the methods find all valid paths in COBOL program code, by traversing and marking the nodes of the program upon being traversed. Accordingly, all usable and reachable code is indicated and marked. This increases safety when working with the code, as removal or alteration of such valid code is indicated, and thus, made unlikely.

11 Claims, 13 Drawing Sheets

Z-ENTRY

Z-EOP

A-ENTRY

IF

CALL A

RESUME CALL A

A-EOP

B-ENTRY

METHOD FOR FINDING ALL VALID INTERPROCEDURAL EXECUTION PATHS ON COBOL IN POLYNOMIAL TIME

BACKGROUND

The present invention, in some embodiments thereof, relates to COBOL (Common Business Oriented Language) programs, and, more specifically, but not exclusively, to methods for scanning valid paths of COBOL programs.

When working with computer programs, all valid interprocedural execution paths in the program should be identified. In doing so, unreachable code, dead code, context-sensitive data flow analysis, finding static non-termination, and behavior preserving transactions, including procedure extraction can be identified.

COBOL programs present unique challenges, due to COBOL's unique control flow semantics. These semantics allow paragraphs and sections to be called, using PERFORM commands, and also executed as normal flow, using GOTO or FALL-THROUGH commands.

Existing solutions are time consuming and not reliable, as they cannot find all valid paths, by either checking for such paths or reporting that code was unreachable, when it was actually reachable via valid paths. This created unsafe situations, as this supposedly unreachable code was removed or altered from the program, resulting in problems with the program. Moreover, the existing solutions are performed in exponential time, which is extremely long for performance, and do not scale to accommodate large programs. An algorithm is performed in exponential time, if T(n) is upper bounded by $2^{poly(n)}$, where poly(n) is a polynomial in n. More formally, using big O notation, an algorithm is in exponential time, if T(n) is bounded by $O(2^{n^k})$, for a constant k.

SUMMARY

Embodiments of the present invention are directed to a computer-implemented method for scanning valid paths of a COBOL program to find all reachable code. The method comprises discovering a plurality of valid executable paths in a COBOL program, comprising: scanning successive nodes in the paragraphs of the COBOL program, according to the order of execution of the COBOL program; marking each scanned node in accordance with an index; moving to a successive node that is not marked, and, analyzing each successive unmarked node for the type of node and, continuing to scan each unmarked node in accordance with the type of the node of the unmarked node, to determine the continued executable path for scanning, and marking each unmarked node upon the node being scanned, with an increased value for the index, until all successive unmarked nodes scanned have been marked. All unmarked successive nodes are scanned until only marked nodes are reachable. Additionally, all of the valid executable paths in the COBOL program include all reachable code in the reachable paragraphs of the COBOL program, and all of the reachable code is found in polynomial time.

Optionally, the method additionally comprises, storing in storage media, data corresponding to the markings for each of the nodes scanned.

Optionally, the index includes positive integers.

Optionally, the increased value for the index when marking an unmarked node is the integer value of the index increased by the positive integer 1.

Optionally, when the successive unmarked node type is an internal node, successor nodes are scanned until an End of Paragraph (EOP) node is reached.

Optionally, when the successive unmarked node type is a CALL node for a called paragraph, the nodes of the called paragraph are scanned, until an End of Paragraph (EOP) EOP node is reached.

Optionally, when a RESUME node is the successive unmarked node, and is arrived at after the CALL node was previously scanned, a return edge is taken to the next successive unmarked node.

Optionally, when the index value of the CALL node is greater than the unmarked node entered after the CALL node, a FALL-THROUGH edge is taken to the next successive unmarked node.

Embodiments of the present invention are directed to a computer-implemented method for scanning valid paths of a COBOL program to find all reachable code. The method comprises, obtaining a COBOL program including code; traversing the nodes of the code consecutively visited, according to the order of execution of the COBOL program, with the order of the traversal being indexed, in polynomial time, the traversal dependent upon the visitation status of the node and the type of node visited including any return edges; and, recording an index value for the order of the traversal of the nodes.

Optionally, when the next unvisited node is an internal node, successor nodes are consecutively visited until an End of Paragraph (EOP) node is reached.

Optionally, when the next consecutive node is unvisited and is a CALL node for a called paragraph, the nodes of the called paragraph are traversed, until an End of Paragraph (EOP) node is reached.

Optionally, when a RESUME node is the next consecutive unvisited node, to and is reached after the CALL node was previously visited, a return edge is traversed to the next unvisited node.

Optionally, when the index value of the CALL node is greater than the unmarked node entered after the CALL node, a FALL-THROUGH edge is traversed to the next unvisited node.

Embodiments of the present invention are directed to a computer program product stored on a non-transitory tangible computer readable storage medium for determining valid executable paths in a COBOL program to find the reachable code. The computer program product comprises: computer usable program code for scanning successive nodes in the paragraphs of the COBOL program, according to the order of execution of the COBOL program; computer usable program code for marking each scanned node in accordance with an index; computer usable program code for moving to a successive node that is not marked, and, computer usable program code for analyzing each successive unmarked node for the type of node and, continuing to scan each unmarked node in accordance with the type of the node of the unmarked node, to determine the continued executable path for scanning, and marking each unmarked node upon the node being scanned, with an increased value for the index, until all successive unmarked nodes scanned have been marked; and, computer usable program code for continuing to scan all unmarked successive nodes until only marked nodes are reachable. Additionally, all of the valid executable paths in the COBOL program include all reachable code in the reachable paragraphs of the COBOL program, and all of the reachable code is found in polynomial time.

Optionally, the computer program product additionally comprises, computer useable program code for storing in storage media, data corresponding to the markings for each of the nodes traversed.

Optionally, the index includes positive integers, and the increased value for the index when marking an unmarked node is the integer value of the index increased by the positive integer 1.

Optionally, when the successive unmarked node type is an internal node, successor nodes are scanned until an End of Paragraph (EOP) node is reached.

Optionally, when the successive unmarked node type is a CALL node of a to called paragraph, the nodes of the called paragraph are scanned, until an End of Paragraph (EOP) EOP node is reached.

Optionally, the computer program product additionally comprises computer usable program code for determining when a RESUME node is the successive unmarked node, and is arrived at after the CALL node was previously scanned, a return edge is taken to the next successive unmarked node.

Optionally, the computer program product additionally comprises computer useable program code for determining whether the index value of the CALL node is greater than the unmarked node entered after the CALL node, a FALL-THROUGH edge is taken to the next successive unmarked node.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3A is an example COBOL program useful in explaining embodiments of the present invention.

Figure 1:
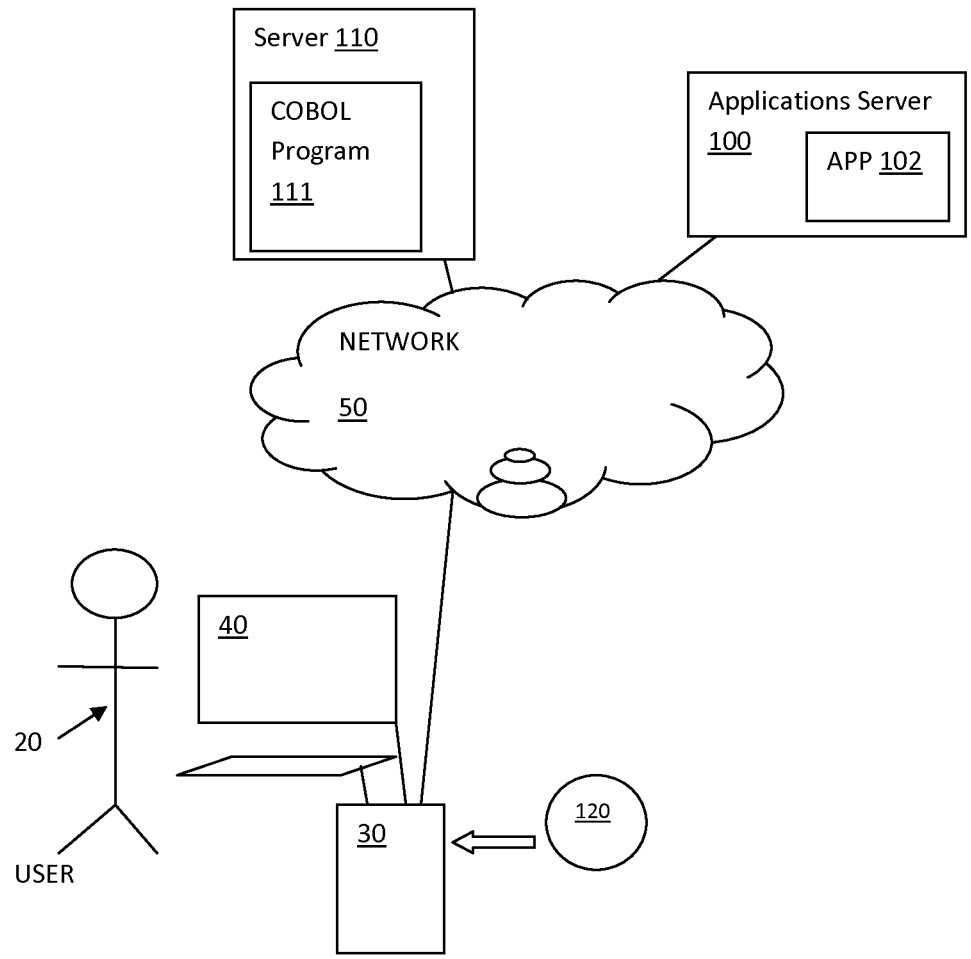
FIG. 1 is a diagram of an exemplary environment in which embodiments of the present invention operate.

Appendix A is attached hereto. This Appendix details another example of embodiments of the present invention used to determine all valid paths in the COBOL Program code.

DETAILED DESCRIPTION OF THE DRAWINGS

Throughout this document, the COBOL programs referenced herein are formed of units known as paragraphs. Each paragraph is formed of a set of one or more nodes, each node being a line of the code or statement of the COBOL program. Each paragraph begins with a label.

Throughout this document, "scanning," "scans" or "a scan," and all forms and derivatives thereof, involve a process where each node is read in succession according to the order of the execution of the COBOL program.

Throughout this document, a "valid path" is a path where all nodes on a sequential path have been scanned only once, and accordingly, are considered as having been visited.

According to an aspect of some embodiments of the present invention there are provided methods for finding valid paths in a COBOL program, for instance, all valid paths in the COBOL program. The valid paths include COBOL code which is executable. The method is performed in polynomial time such that in running time the execution is upper bounded by a polynomial expression in the size of the input for the algorithm, in big O notation, i.e., $T(n)=O(n^k)$, for a constant k.

Alternatively, some embodiments also disclose polynomial solutions scaled to accommodate large COBOL programs, such as those COBOL programs with greater than one million lines of code. As a result of finding all valid paths, all usable and reachable code is indicated and marked, increasing safety, as removal or alteration of such valid code is indicated and thus, unlikely.

Some embodiments of the present invention are directed to creating a context sensitive graph, used to find all valid paths for all reachable code in the COBOL program. This is achieved by methods of scanning the COBOL program and generating a record of the context, for example, by indexing each scanned on or visited node, and not visiting a node more than once.

Some embodiments of the present invention are directed to providing a polynomial time algorithm in order to scan all valid paths of a COBOL program. The methods disclosed by some of the embodiments herein, are for scanning valid COBOL paths, over nodes of paragraphs, in polynomial time. The disclosed methods run in polynomial time, because when a called paragraph has already been visited, the process moves directly to the exit of the paragraph without visiting the same nodes again. Additionally, the scanning of the valid paths is performed by storing the call return order in memory, or other storage media.

During the scanning process, when there is a PERFORM statement for a called paragraph of the program, if the called paragraph was not visited, it is not marked as such. The nodes of the called paragraph continue to be scanned. However, should the called paragraph have been visited, as indicated by its nodes being marked, a scan is made from the entry to the exits of all intermediate paragraphs. For example, the exits may include GOT( )statements, such that a paragraph may have many exits. The scan continues until there is an arrival at entry to an unvisited paragraph, as its nodes are unmarked, or there is an arrival at the end of the paragraph.

Upon arriving at an unvisited paragraph, the paragraph,in particular, the nodes of the paragraph, is scanned, Upon scanning to the end of the paragraph, it is determined whether there is a call site corresponding to a return edge that was previously visited, but not in the resume. If this is the case, the return edge must also be taken. Additionally, if the call site was visited after the current paragraph entry, then the FALL-THROUGH edge must also be taken.

Some embodiments of the present invention are such that the process of detecting all valid paths in the COBOL program use small amounts of memory. This is because each node or statement of the program, visited by the process of some embodiments of the present invention, is marked by a single positive integer, with a group of positive integers representative of each valid path of reachable code. These integers and groups thereof, when stored in storage media, occupy a small amount of the storage media. By using positive integers and storing in this manner, the valid paths found by embodiments of the present invention can be easily recalled.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which shows an operating environment for a non-limiting exemplary system 100, also known as application server, in accordance with some embodiments of the present invention. The non-limiting exemplary system 100 is set to determine all valid paths in the code in order to find all reachable code in the COBOL program. The application server 100 is shown linked over a network 50, either directly or indirectly. The server 100 includes an application (APP) 102, which is, for example, downloaded by users 20, to their machines, e.g., computer 30, with display screen 40, over the network 50. The application 102 provides embodiments of the present invention useful in detecting all valid paths of a COBOL program in order to find all reachable code in polynomial time.

A second server 110, which stores, for download, and runs COBOL programs is also linked to the network 50. This linkage is either directly or indirectly, as per that for the application server 100.

Embodiments of the present invention may also be stored on non-transient storage media, represented for example, by a compact disc 120. This compact disc 120 is adapted to be operated by the computer 30 of the user 20.

The applications server 100 utilizes hardware, software, processors and various storage media for performing its operations. Similarly, the computer 30 of the user includes hardware, software, processors and various storage media for performing its operations.

Figure 2A:
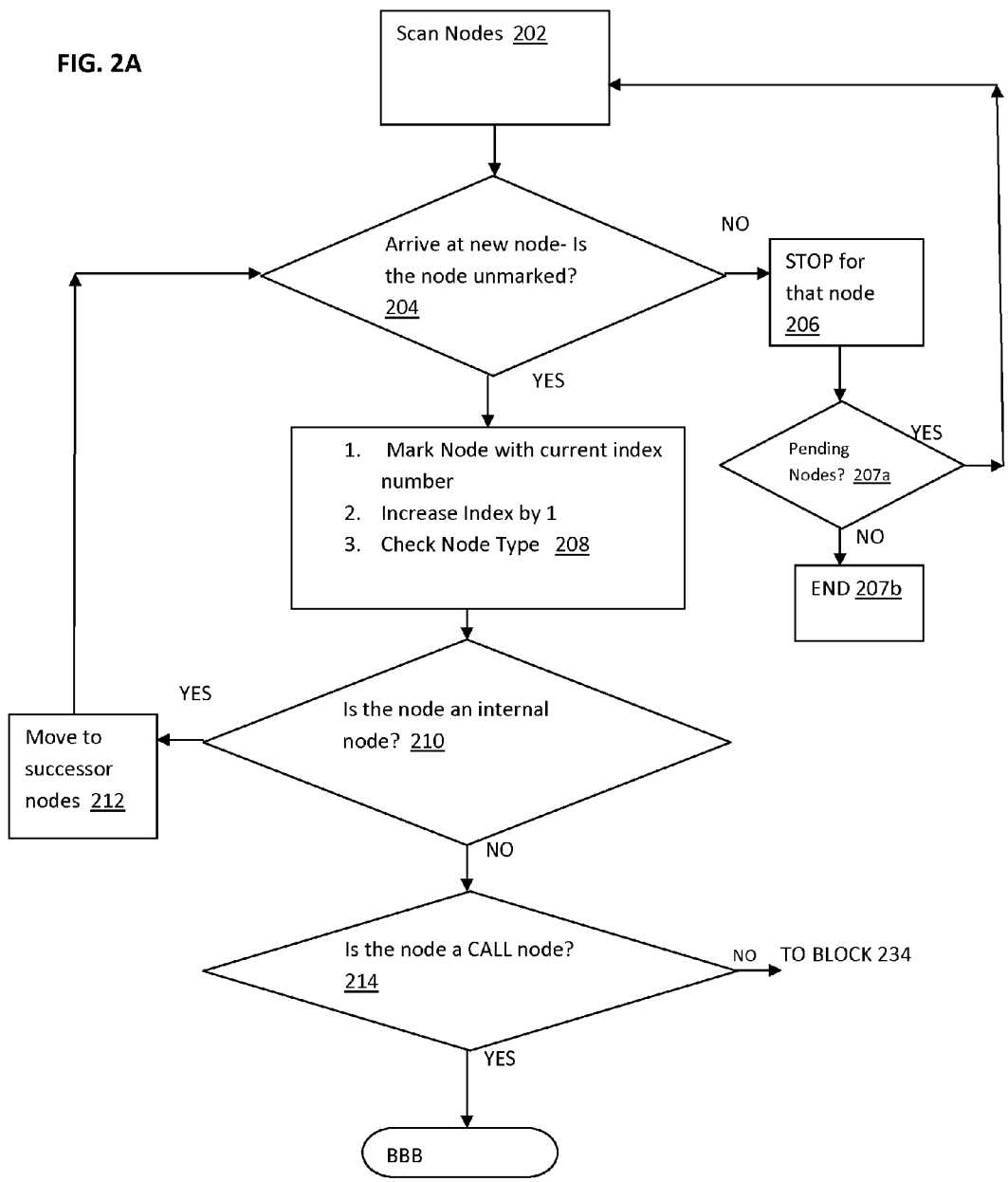
FIGS. 2A-2C form a flow diagram of a process in accordance with embodiments of the present invention.
Figure 2B:
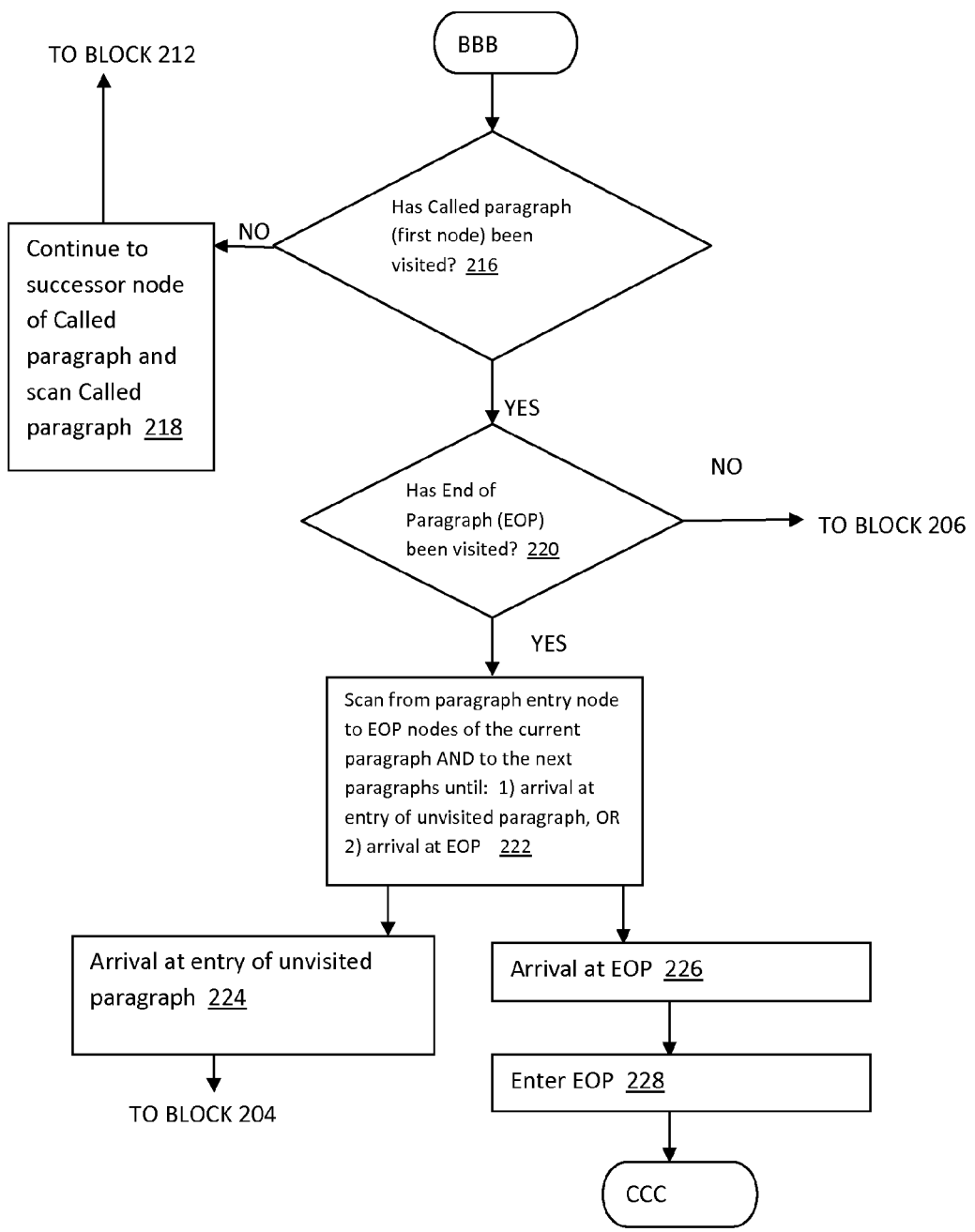
Figure 2C:
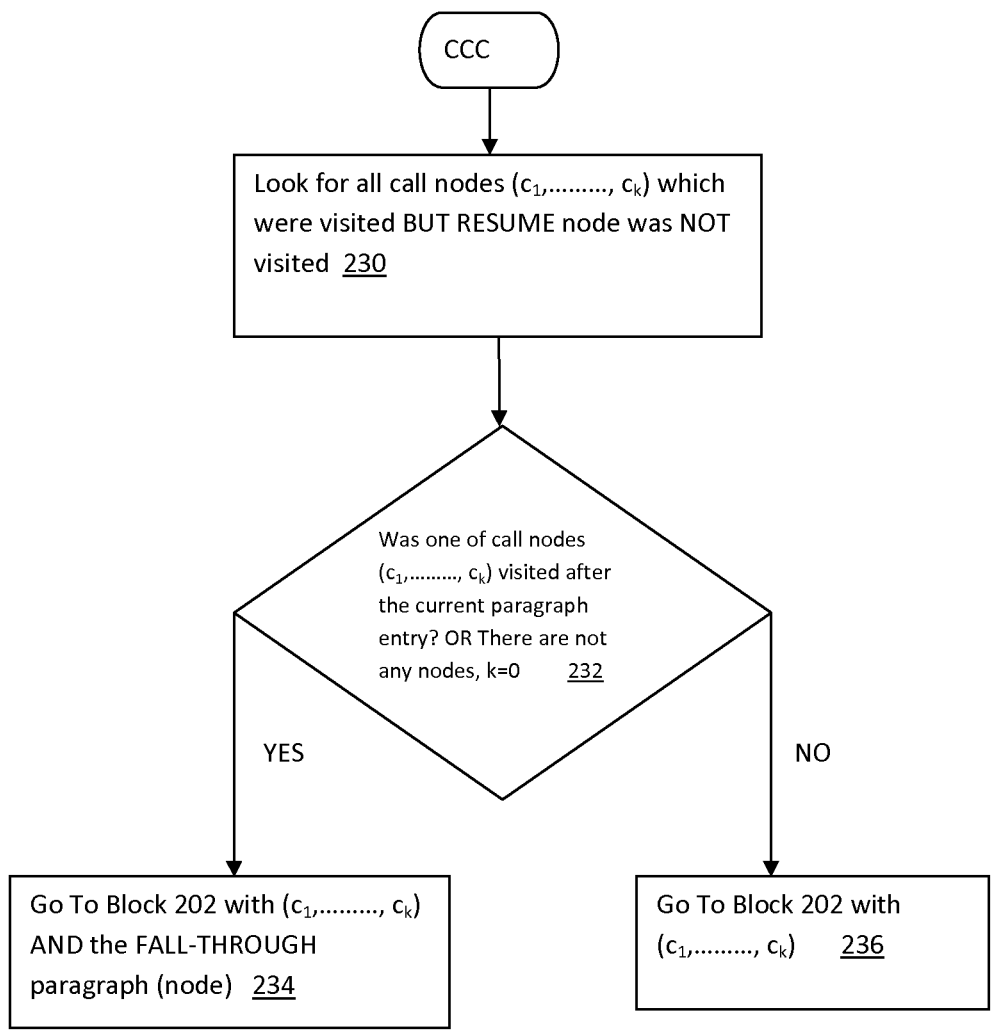

Attention is now directed to FIGS. 2A-2C, which form a flow diagram. This flow diagram details a computerized process performed by a computer executing the application 102, or the program stored on the storage media 120, when applied to a COBOL program, whose code is being executed or run. The COBOL program is, for example, the COBOL program 111 at the second server 110, or on the user's computer 30, or other computer, server, or other computerized device or apparatus, linked to the network 50. The process finds all valid paths to find all reachable code of a COBOL program in polynomial time. The process is typically performed automatically and in real time by the computer system analyzing the requisite COBOL program. The process outputs all of the valid paths, and accordingly, all of the reachable code of the COBOL program that was scanned and analyzed. With this information, the COBOL program can be edited, with dead or unreachable code accurately identified, allowing it to be safely removed from the COBOL program. The aforementioned output is also usable in creating a context sensitive graph, used to find all valid paths for all reachable code in the COBOL program.

The process begins at block 202, where the first paragraph, in particular, the nodes of the paragraph are scanned. At block 204, there is arrival at a new node and a determination if it is unmarked. If the node is not unmarked, meaning that it is marked and this node has been visited, the process moves to block 206, where it stops for that particular node. The process moves to block 207a, where it is determined whether there are more pending nodes, and when so, the process returns to block 202. However, when there are not any pending nodes, e.g., successor nodes, the process moves to block 207b, where it ends.

If the node is unmarked, the node has not been visited in accordance with the process, and the process moves to block 208. At block 208, the node is marked with the current index number, indicating its having been visited by the process. The index is increased by the positive integer "1", and becomes the new current index, and the node type, for example, an internal node or a call node, is checked, for example, by being read.

The process moves to block 210, where it is determined whether the node is an internal node. When the node is an internal node, the process moves to block 212 for the successor node, and ultimately returns to block 204 for processing of this successor node. When the node is not an internal node, the process moves to block 214.

At block 214, it is determined whether the node is a call node. When not a call node, the process moves to block 226, which is detailed below.

When the node is a call node at block 214, it is determined when the call node, i.e., the first node of a called paragraph, has been visited, at block 216. When the call node has not been visited, i.e., it is unmarked, the process moves to block 218, where the CALL paragraph (nodes therein) are scanned in succession, in accordance with blocks 212 and 204 for each node, in accordance with the movement of the process.

Turning back to block 216, when the called paragraph, the first node thereof, has been visited, i.e., it is marked, the process moves to block 220. At block 220, it is determined whether the End Of Paragraph (EOP) node for the called paragraph has been visited, i.e., it is marked. When it has not been visited, the process moves to block 206, where the process stops for that node. When the EOP node for the called paragraph was visited, the process moves to block 222, for the first node of the next paragraph.

At block 222, the process moves from the first or entry node of the current paragraph, and also to the exits of the current paragraphs, which may be End of Paragraphs or GOTO statements, until 1) an arrival at the entry of an unvisited paragraph, at block 224; or, 2) an arrival at the EOP, at block 226, both of which may occur in parallel.

Moving to block 224, upon arrival at the unmarked entry or first node of an unvisited paragraph, the process moves to block 204. The process resumes from block 204 for the entry or first node.

In parallel to moving to block 224, the process moves to block 226, where it has arrived at the End of Paragraph (EOP) node. The EOP node is entered at block 228. The process now moves to block 230, where call nodes, indicated by $c_1, \ldots, c_k$, which have not been visited (are unmarked), are identified, and a search is performed for RESUME nodes, which were not visited. The RESUME nodes, which have not been visited are unmarked.

Moving to block 232, from block 230, it is determined whether one of the call nodes, $c_1, \ldots, c_k$, has been visited after the current paragraph entry, OR whether there are not any call nodes, where k=0. When yes, the process moves to block 202, with nodes $c_1, \ldots, c_k$, by going through the fall through paragraph. When no, the process moves to block 202 with nodes $c_1, \ldots, c_k$. As a result of the process, all possible valid pathways and reachable code in the COBOL program has been found.

The markings of the nodes are stored in storage media, as positive integers. By storing integers, only small amounts of storage are needed for storing all of the data for the valid pathways and reachable code in the COBOL program.

Figure 3B:
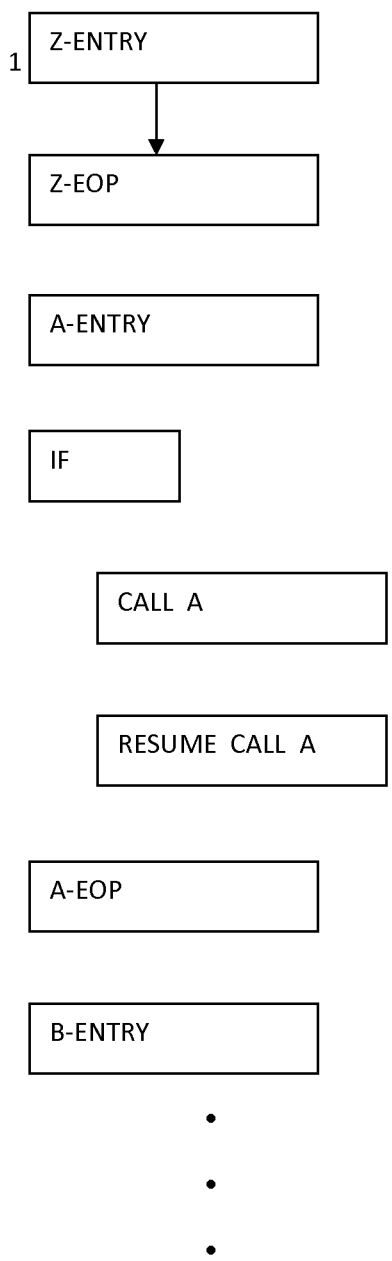
FIGS. 3B-3I are the program of FIG. 3A as its pathways are determined.

Attention is now directed to FIGS. 3A-3I, to show an exemplary operation of the process, including an algorithm, operating on a sample COBOL program 300, shown in FIG. 3A. Reference is also made to FIGS. 2A-2C, when describing FIG. 3.

The process of FIGS. 2A-2C is performed on the COBOL program 300, and begins at Paragraph Z, at the entry node, indicated by "Z-Entry." The index is initially set at "0." The flow diagram from blocks 202, 204, 208 to 210 is followed, with this node marked with "1" in accordance with Index=0+ 1. Since this entry node is an internal node, the process moves to block 212, and back to block 204 for the next node, "Z-EOP (End of Paragraph), as shown in FIG. 3B.

Figure 3C:
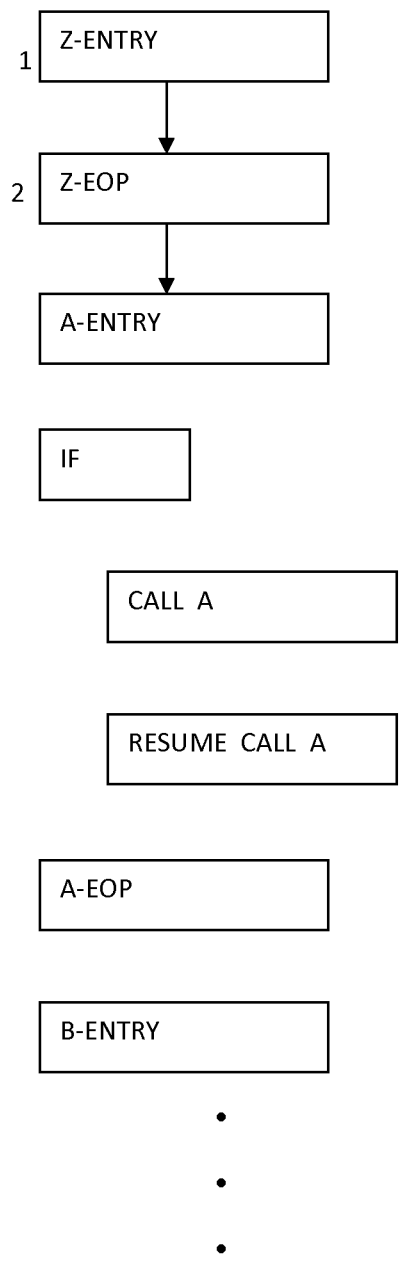

This Z-EOP node is marked with the current index number 2 (1+1), at block 208, in FIG. 3C. As the node is an EOP node, it is not an internal node, and moves through block 210, and is not a call node, and moves through block 214 to block 226, where there is an arrival at the EOP (node). The process moves through blocks 228, 230, to block 232. Here k=0, since there is not a CALL to the "Z" paragraph. The process moves to block 234, where the fall through paragraph A, at node "A-Entry," is reached, with the process now at block 202 for the node "A-Entry."

Figure 3D:
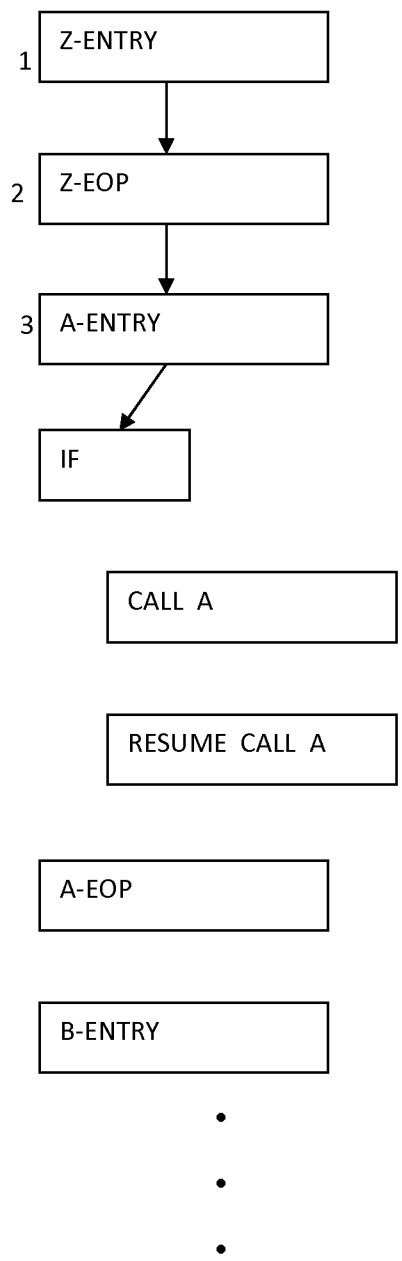

The process moves through block 204, as "A-Entry," which was initially not marked, is now marked with the current index "3" (2+1), at block 208. As this node is an internal node, the process moves to block 212 and returns to block 204, where the "If" node, another internal node, has been arrived at, as shown in FIG. 3D.

Figure 3E:
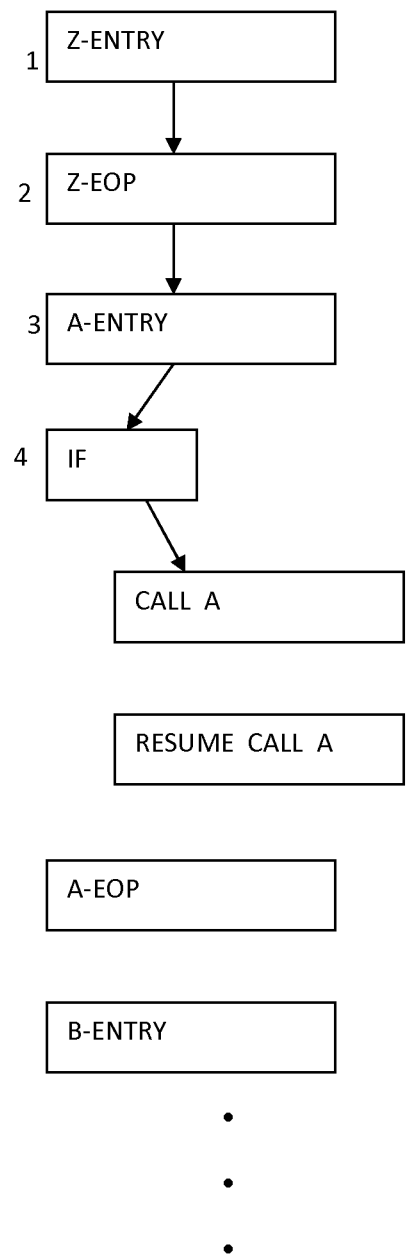

As this "If" node is unmarked, it is now marked with the current index "4" (3+1), at block 208. As this node is an internal node, the process moves to block 212 and returns to block 204, where the "Call A" node, a CALL node, has been arrived at, as shown in FIG. 3E.

Figure 3F:
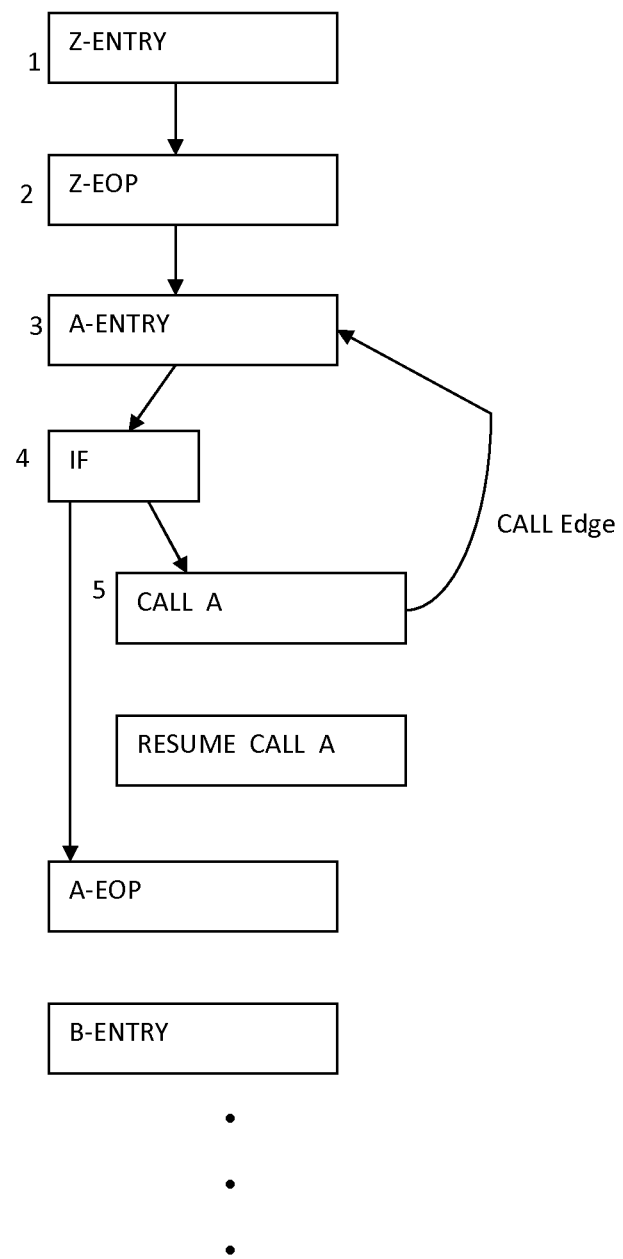

The process moves from block 204 to 208, to 210, to 212, to 214 marking the current index at "5" (4+1), at block 208, as shown in FIG. 3F. The process now moves to block 216, taking the CALL Edge, where it is determined if the called paragraph first node has been visited. In this case, the called paragraph, first node "A-Entry" has been visited, as it is marked with the index number "3". Accordingly, the process moves to block 206, where it stops for the node "CALL A." The process moves to block 207a, where there is a pending node, the A-EOP node, as shown in FIG. 3F.

Figure 3G:
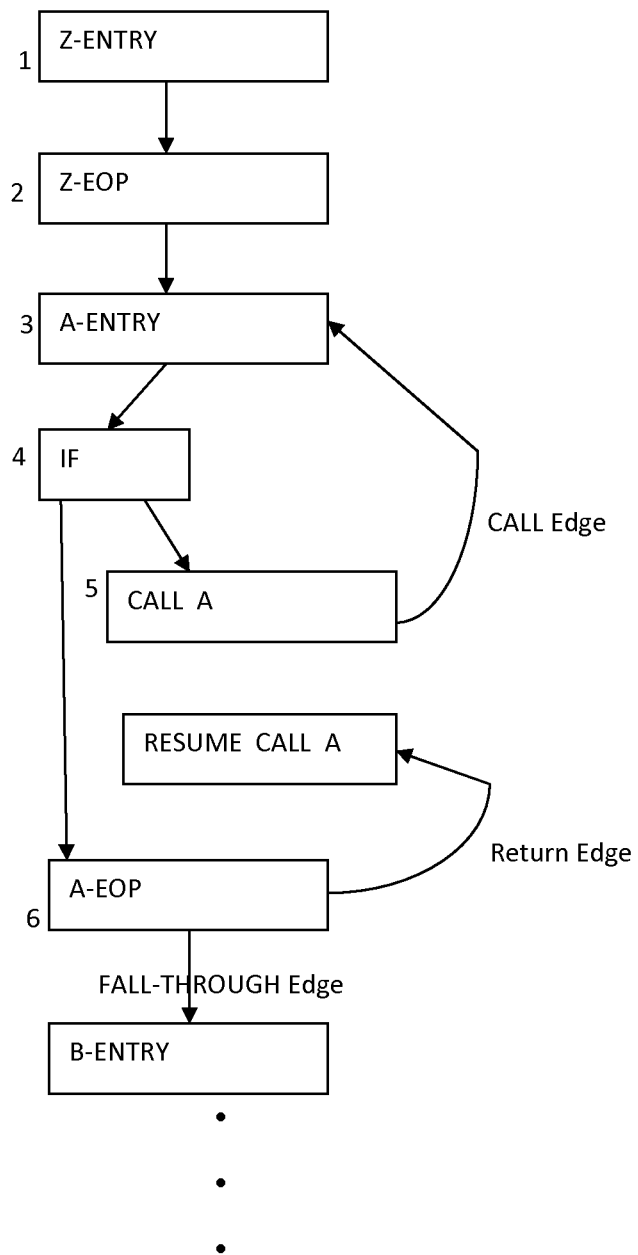

For the A-EOP node, the process begins at block 202 (from block 207a), and at block 204 arrives at a new node, which is unmarked, resulting in going from the "IF" node to the "A-EOP" node, as shown in FIG. 3F. As this A-EOP node is unmarked, the process moves to block 208, where it is now marked with the next index integer "6". The process moves to block 210 and 212, where as an EOP node, the A-EOP node is not an internal node (block 210), and is not a call node (block 212), such that the process moves to block 226, to handle this EOP node. The process moves through block 228 to block 230, where in this case the call node, CALL A, was visited but the RESUME node, RESUME CALL A was not visited. The CALL node, CALL A is node $c_1$. Accordingly, the process moves to block 232, where a CALL node (CALL A with Index Number 5) was visited after the current paragraph entry (A-Entry with Index Number 3). Accordingly, the process moves to block 234, where the process moves to block 202 for both the RESUME CALL A node, taking the Return Edge, and the B-Entry Node, the FALL-THROUGH paragraph (block 234), taking the FALL-THROUGH edge, as shown in FIG. 3G.

Figure 3H:
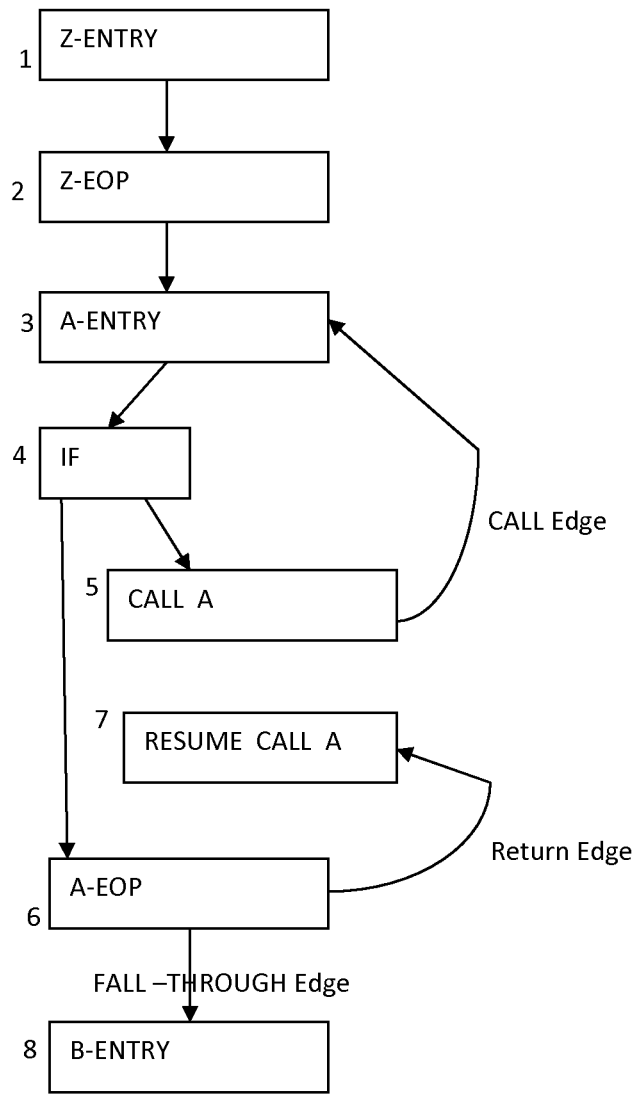
Figure 3I:
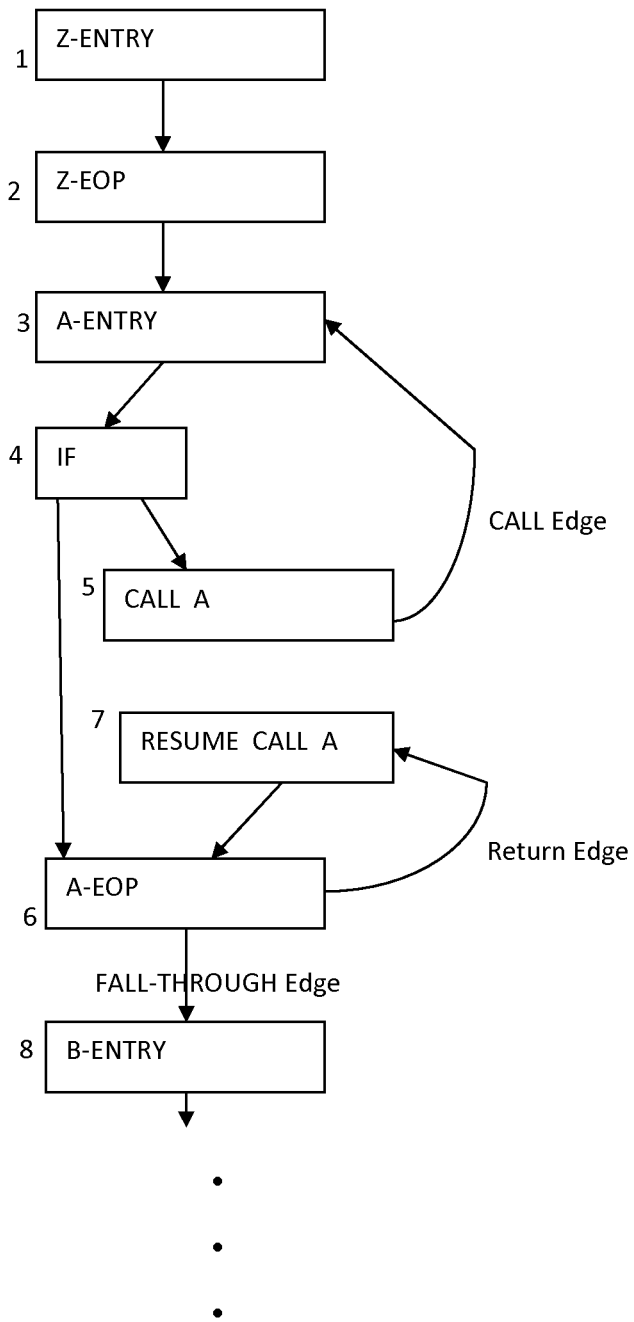

The RESUME CALL A node and the B-Entry Node are now processed contemporaneously at block 202, as shown in FIG. 3H. For RESUME CALL A node, the process takes the return edge from A-EOP. From block 202, the process moves to block 204. The RESUME CALL A node is unmarked, whereby the process moves to block 208, where it is marked with the next successive index number "7". The process now moves to block 210, where the RESUME CALL A node is an internal node, so the process moves to block 212 and then to the successor node, A-EOP, with Index Number 6. As this node has been visited, it is marked, as per bock 204, with the process moving to block 206, where the process stops for this node, as shown in FIG. 3I.

Returning to block 202, the B-Entry node is analyzed. The process moves to block 204, where the node is marked with the next successive index number, here "8", as shown in FIG. 3H. The process continues from block 204, to the next node, as shown in FIG. 3I.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term reachable code is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for scanning valid executable paths of a COBOL program to find all reachable code comprising:
    scanning a successive node in paragraphs of the COBOL program, according to an order of execution of the COBOL program, wherein each node in the paragraphs of said COBOL program is a statement including at least part of a line of code;
    marking the scanned node in accordance with an index value;
    moving to a successive unmarked node of the scanned node;
    analyzing the successive unmarked node for determining a type of the successive unmarked node, and determining a continued executable path for scanning based on the type of the successive unmarked node, wherein determining the continued executable path for scanning based on the type of the successive unmarked node comprising:
        when the successive unmarked node type is an internal node, successor nodes are scanned until an End of Paragraph (EOP) node is reached,
        when the successive unmarked node type is a CALL node for a called paragraph, nodes of the called paragraph are scanned, until an End of Paragraph (EOP) EOP node is reached,
        when the successive unmarked node type is a RESUME node, and is arrived at after a CALL node was previously scanned, a return edge is taken to the next successive unmarked node,
        marking each scanned node with an increased value for the index;
        when an index value of the CALL node is greater than a node entered after the CALL node, a FALL-THROUGH edge is taken to a next successive unmarked node; and
    continuing to scan all unmarked successive nodes until only marked nodes are reachable,
    wherein all of the valid executable paths in the COBOL program include all reachable code in the reachable paragraphs of the COBOL program, and all of the reachable code is found in polynomial time.

2. The computer-implemented method of claim 1, additionally comprising:
    storing in storage media, data corresponding to said markings for each of the nodes scanned.

3. The computer-implemented method of claim 1, wherein the nodes in the paragraphs of the COBOL program include a plurality of lines of code.

4. The computer-implemented method of claim 1, wherein the index includes positive integers.

5. The computer-implemented method of claim 4, wherein the increased value for the index when marking an unmarked node is the integer value of the index increased by the positive integer 1.

6. The computer-implemented method of claim 4, further comprising: grouping in groups said positive integers of said marked nodes of each of said plurality of valid executable paths, and storing said groups in storage media.

7. A computer-implemented method for scanning valid paths of a COBOL program to find all reachable code comprising:
    obtaining the COBOL program including code;
    traversing nodes of the code consecutively visited, according to execution of the COBOL program, with an order of the traversal being indexed with an index value, in polynomial time, the traversal dependent upon a visitation status of a unvisited node and a type of the unvisited node including any return edges, wherein each node of said nodes is a statement including at least part of a line of code, and wherein the traversal dependent upon the visitation status of the unvisited node and the type of unvisited node comprising:
        when the next unvisited node is an internal node, successor nodes are consecutively visited until an End of Paragraph (EOP) node is reached,
        when the next consecutive node is unvisited and is a CALL node for a called paragraph, nodes of the called paragraph are traversed, until an End of Paragraph (EOP) node is reached,
        when a RESUME node is the next consecutive unvisited node, and is reached after the CALL node was previously visited, a return edge is traversed to a next unvisited node,
        marking each traversed node by increasing the index value;
        when the index value of the CALL node is greater than a node entered after the CALL node, a FALL-THROUGH edge is traversed to the next unvisited node; and
    recording the index values for the order of the traversal of the nodes.

8. A computer program product stored on a non-transitory tangible computer readable storage medium for determining valid executable paths in a COBOL program to find the reachable code, the computer program product comprising:
    computer usable program code for scanning a successive node in paragraphs of the COBOL program, according to an order of execution of the COBOL program, wherein each node in the paragraphs of said COBOL program is a statement including at least part of a line of code;
    computer usable program code for marking the scanned node in accordance with an index value;

computer usable program code for moving to a successive unmarked node;

computer usable program code for analyzing the successive unmarked node for determining a type of the successive unmarked node, and determining a continued executable path for scanning based on the type of the successive unmarked node, wherein determining the continued executable path for scanning based on the type of the successive unmarked node comprising:

when the successive unmarked node type is an internal node, successor nodes are scanned until an End of Paragraph (EOP) node is reached, when the successive unmarked node type is a CALL node for a called paragraph, nodes of the called paragraph are scanned, until an End of Paragraph (EOP) EOP node is reached, when the successive unmarked node type is a RESUME node, and is arrived at after a CALL node was previously scanned, a return edge is taken to the next successive unmarked node, marking each scanned node with an increased value for the index;

when an index value of the CALL node is greater than a node entered after the CALL node, a FALL-THROUGH edge is taken to a next successive unmarked node; and computer usable program code for continuing to scan all unmarked successive nodes until only marked nodes are reachable, wherein all of the valid executable paths in the COBOL program include all reachable code in the reachable paragraphs of the COBOL program, and all of the reachable code is found in polynomial time.

9. The computer program product of claim 8, additionally comprising: computer useable program code for storing in storage media, data corresponding to said markings for each of the nodes traversed.

10. The computer program product of claim 8, wherein the index includes positive integers, and the increased value for the index when marking an unmarked node is the integer value of the index increased by the positive integer 1.

11. The computer program product of claim 10, further comprising computer usable program for grouping in groups said positive integers of said marked nodes of each of said valid executable paths, and storing said groups in storage media.

\* \* \* \* \*